June 13, 1967
B. T. ROGERS, JR  3,324,758
OPTICAL PLUMB FOR A TRANSIT HAVING A TELESCOPE SUCH THAT THE
TELESCOPE CAN VIEW THROUGH A COMPASS AT A POINT
BELOW THE TRANSIT
Filed Aug. 12, 1963
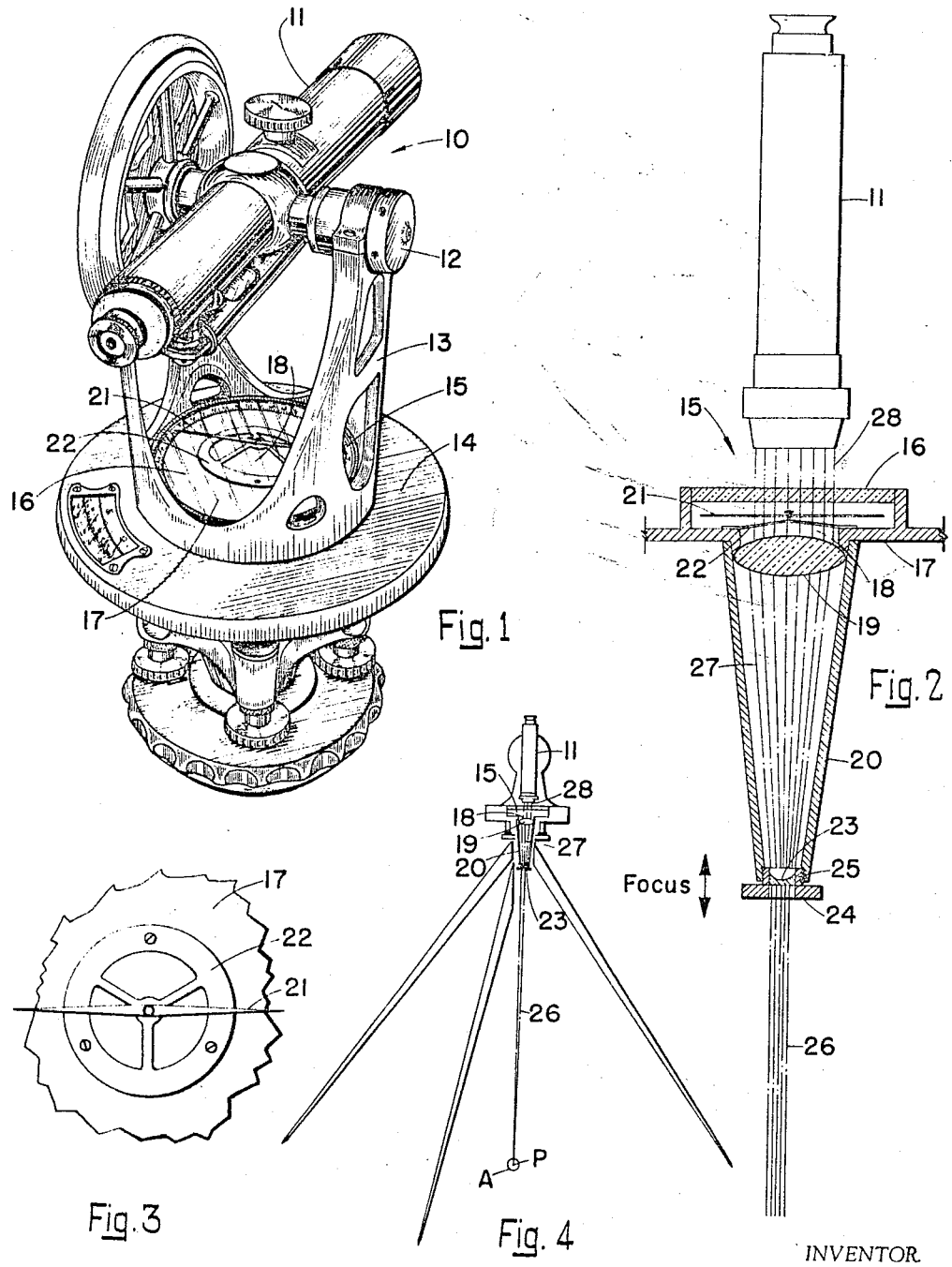
INVENTOR.
Benjamin T. Rogers, Jr.
BY Donald E. Payne
his attorney

United States Patent Office 3,324,758
Patented June 13, 1967

3,324,758
OPTICAL PLUMB FOR A TRANSIT HAVING A TELESCOPE SUCH THAT THE TELESCOPE CAN VIEW THROUGH A COMPASS AT A POINT BELOW THE TRANSIT
Benjamin T. Rogers, Jr., Rinconada, N. Mex., assignor to The Regents of the University of California, Berkeley, Calif.
Filed Aug. 12, 1963, Ser. No. 301,358
4 Claims. (Cl. 88—2.2)

This invention relates to an improved optical plumb for transits and it pertains more particularly to a unique supplemental optical system and compass modification built into a transit.

In modern surveying practice, characterized by short shots as the size of private holdings in general become smaller, the principal source of error in the survey is frequently found in the inability of the surveyor to make an accurate set-up over a given point. The need for an inexpensive accurate system of optical plumbing applied to the conventional surveyor's transit has become acute. A so-called "optical plumb" is now available on many transits to take the place of the old plumb-bob-on-a-string, which was a nuisance under windy conditions. However, known optical plumb systems either require the removal or absence of the usual compass or require the use of an additional, mirror or prism-containing, sighting system with a sight tube below the level of the compass. The former is a nuisance because of the hazards to which loose parts are subjected and because replacement of parts gives rise to inaccuracies not encountered with fixed parts (due to wear, dirt, battering, human error, etc.). The prism-containing system adds considerable expense, is cumbersome, and it sacrifices the ability to use the optically precise lens system of the transit telescope, which may have a magnification of about 22×. The object of this invention is to provide at very low cost an engineer's transit in which the compass is fixed (i.e., is not removable in ordinary usage) but in which a simple inexpensive supplemental lens or lens system in a hollow spindle of the transit enables sharp focusing of a reference point on the ground or floor under the transit, and the transit telescope itself is used as a part of the optical plumb system for obtaining the desired image without loss of sharp detail (although the operation of the system is not critically dependent on extremely precise adjustment or alignment of the supplemental optical elements). Other objects will become apparent as the detailed description of the invention proceeds.

Briefly, in accordance with my invention, the transit employs a fixed or permanently mounted compass of the type heretofore used except that it has a central light passageway through its base and a mount for holding the compass-needle support without unduly blocking said light passageway. This light passageway may be covered with an ordinary glass seal but the passageway is preferably sealed by an optical lens above the hollow inner spindle of the transit. The lens or lens system below the light passageway in the base of the compass may be encased in known types of hollow spindles, which may be tapered with their small ends at their bases. The lens which is just below the compass receives divergent light bundles (sometimes called beams or rays) from a reference point and field area around said point beneath the transit and transmits this light up through the passageway in the compass as *parallel* light bundles. Structurally, the lens which forms the central base of the compass may likewise form the top closure of the hollow spindle. A smaller lens may be movably mounted at the base of the hollow spindle to permit sharp focusing over greater distances and to spread the incoming light over the larger, convex lens which approximates the diameter of the objective lens of the telescope so that the telescope may function at maximum efficiency.

In use, the telescope of the transit is directed vertically down toward the center of the compass so that the axis of the telescope is coincident with the axis of rotation of the hollow spindle and also is coincident with the light path through the passageway and the lens or lenses in the hollow spindle. The telescope is focused at infinity to receive the parallel light bundles and to show the reference point and surrounding field area in sharp focus. The telescope may be rotated on its vertical axis through 360° to insure that the point remains fixed so that the transit is properly positioned. Since the bundles of light from the reference point are converted by the lens to parallel bundles of light, the compass needle and needle support, which intervene between the lens and the telescope, do not blur or obscure the image of the reference point but merely diminish the available light or "effective aperture."

The invention will be more clearly understood from the following detailed description of a preferred example thereof read in conjunction with the accompanying drawings which form a part of this specification and in which:

FIG. 1 is a simplified view of an engineer's transit, showing the telescope and the subadjacent compass which has a light passageway therethrough with intervening compass needle and needle support.

FIG. 2 is a diagrammatic section through the compass and lens system which is in the hollow spindle, showing light from a reference point being converted to parallel bundles.

FIG. 3 is a detail top view of a spider support for the compass needle, and

FIG. 4 is a schematic view of the transit being plumbed by the optical system of this invention.

The invention will be described as applied to a Brunson Model 50 Engineer's Transit 10 which is described in Bruning General Catalogue (copyright 1957 by Charles Bruning Co., Inc.) at pages 294–299, although the invention may obviously be applied to transits manufactured by others, and to jig transits, etc., as well as engineer's transits used in surveying work. The telescope 11 of the transit may be rotated 360° around a central vertical axis and 360° around a horizontal axis, the bearings 12 for the horizontal axis being carried by "U-type" standard 13. At the center of top plate 14 is a compass 15, which is not designed to be removed for optical plumbing and may hence be designated as a "fixed compass" (meaning non-removable rather than non-rotatable). The top side 16 of the compass is of glass which provides a transparent passageway for light. The metal base 17 of the compass is provided with a central opening 18 of about the same diameter as the objective lens of telescope 11, i.e., about 25 mm. in this particular example. This opening is closed at its base by a 25 mm. diameter convex or converging lens 19 of +5 diopters, said lens being sealed in a position at the base of opening 18 and at the top of hollow spindle 20.

The provision of light passage 18 through the base of the compass requires modification of the structure for supporting the compass needle 21. In this example needle 21 is mounted on a spider bearing support 22 which in turn is secured to the compass base 17 at the periphery of opening 18 (see FIG. 3). It is desirable that the needle 21 and its bearing and bearing support offer minimum obstruction to light passing through opening 18, and instead of employing spider 22, the needle bearing support may be affixed to lens 19 by means of a suitable cement in a small hole drilled in the top of lens 19 itself.

At its lower end the hollow spindle 20 is provided with a 10 mm. diameter concave or diverging lens 23 of −8 diopters, said lens 23 being in a mount 24 which can be moved up or down, e.g. by rotating mount 24 on threads 25, for obtaining a sharp focus. With the upper +5 diopter lens 19 about 8½ cm. from the lower −8 diopter lens 23 and the distance from lens 23 to reference point P in the range of about 30 to 50 inches, e.g. about 39 inches, the turning of lens mount 24 on threads 25 enables the attainment of a sharp focus throughout the range. Also the small lens 23 is designed to "spread" the incoming light over the larger lens 19, so that the parallel bundles of light passing up through the compass opening 18 constitute a column of about the same diameter as the objective lens of the transit telescope.

To effect optical plumbing with my system, an ordinary mechanical plumb bob (not shown) may first be employed to approximate the position of the well leveled transit above the reference point. Then the mechanical bob is removed, the focus of the telescope 11 is set at infinity, and the telescope is directed down vertically toward the center of the compass, which remains in the instrument. By turning lens-mount 24 at the base of the transit a sharp focus is obtained so that the eye looking through telescope 11 sees not only the sharply defined point itself but also sees a field area A of several centimeters around the point. By turning the instrument around its vertical axis through an angle of preferably 360° it can readily be determined whether or not there is apparent motion of the reference point, which of course remains in substantially fixed position if the instrument is accurately plumbed, although there may be apparent target motion of the order of about 0.0025 inch.

In the example above described light bundles 26 from field area A and point P are caused by lens 23 to diverge so that when they reach lens 19 they extend over an area that approximates the area of the telescope lens. Lens 19 causes the diverging bundles of light 27 to pass upwardly therefrom as substantially parallel light bundles 28. This is important because in the path of parallel light bundles of light, the compass needle 21 and needle support 22 do not blur the final image as would be the case if such objects were in the path of diverging light bundles. Even with only a 10 mm. diameter lens 23, adequate light is picked up to give a bright and highly resolved, sharp image of the reference point when viewed through telescope 11. A slight adjustment of the focus of the telescope itself may be necessary to obtain the sharpest image since it is difficult to obtain light bundles that are precisely parallel and an infinity setting on the telescope that is precisely accurate. Nevertheless, the nature of the auxiliary optical system (lens 19 and 23) is such that remarkable precision is attainable with this simple and inexpensive system.

Since the distance from lens 19 to point P usually does not vary more than a few inches, I may employ a still simpler and less expensive supplemental optical system, with some sacrifice in image sharpness and brightness but with good precision nevertheless. By using a lens 19 of +1 diopter and using a "zero" lens (flat window) in place of lens 23, a system is obtained which requires no adjustment of focus in the supplemental system, which gives sharpest focus at about 40 inches and acceptable sharpness in the distance range of about 35 to 45 inches. Here again the lens 19 converts diverging light bundles from A and P into substantially parallel light bundles which pass up through the compass to the telescope. Slight adjustment may be required of the telescope focus for maximum sharpness, but there will be no blurring of the image because of the presence of the needle and needle mount in the light path.

Other supplemental optical systems may be employed, including those in which the small lens at the lower end of the hollow spindle is a positive lens of one or more elements, provided that they pick up a reasonably large field area, transmit sufficient light to the telescope for required brightness, insure substantially parallel light bundles in the light path through the compass, and enable the production of a sharp, well defined image when viewed through the telescope. While the invention has been described in great detail as applied to particular examples, alternative designs and arrangements will be apparent from the foregoing description to those skilled in the art.

I claim:

1. An optical plumb system which comprises, in combination:
   (a) a transit provided with a vertical hollow mounting spindle and with a telescope which is pivotally mounted on an axis which is normal to said vertical spindle and which may be directed downwardly with its axis coincident with that of the hollow spindle,
   (b) a fixed compass having a needle and needle support and being of a small cross-section interposed on the spindle axis between the telescope and the hollow spindle, said compass having both a base and a cover which permit the passage of light therethrough, and
   (c) a supplemental optical system in the hollow spindle comprising at least one lens below the compass but adjacent thereto for converting divergent bundles of light from a reference point and surrounding area below the transit to substantially parallel bundles of light between said lens and said telescope,
whereby the compass needle and support which are between said lens and said telescope do not blur the image of the reference point.

2. The combination of claim 1 wherein said hollow mounting spindle has an upper large end and a lower small end and in which the supplemental optical system consists essentially of a convex lens adjacent the base of the compass and at the upper large end of the hollow spindle, and a small diameter lens at the lower small end of the hollow spindle, the latter being movably mounted for focusing.

3. An optical plumb system which comprises, in combination:
   (a) a transit provided with a vertical hollow mounting spindle and with a telescope which is pivotally mounted on an axis which is normal to said vertical spindle and which may be directed downwardly with its axis coincident with that of the hollow spindle,
   (b) a fixed compass on the spindle axis interposed between the telescope and the hollow spindle, said compass having
   (c) a light passageway in the center of the base of said compass,
   (d) a needle and needle support of small projected area in the extended path of said light passageway, and
   (e) a supplemental optical system in the hollow spindle comprising at least one lens below the compass but adjacent thereto for converting divergent bundles of light from a reference point and surrounding area below the transit to substantially parallel bundles of light between said lens and said telescope.

4. Transit structure which comprises in combination:
   (a) a vertical hollow mounting spindle,
   (b) a compass secured to said hollow spindle at the upper end of said spindle and on the axis of said spindle, there being (c) a light passageway through an opening in the base of the compass communicating with said hollow spindle,
(d) a needle and needle support of small projected area in the extended path of said light passageway, and
(e) a lens mounted at the top of the hollow spindle and forming a closure for said opening in the base of the compass, said lens being designed to receive divergent bundles of light from a reference point and surrounding area below the transit and to transmit substantially parallel bundles of light upwardly through the light passageway in the compass.

No references cited.

JEWELL H. PEDERSEN, *Primary Examiner.*

O. B. CHEW, *Assistant Examiner.*